No. 866,431. PATENTED SEPT. 17, 1907.
J. D. CASE.
POCKET KNIFE.
APPLICATION FILED FEB. 16, 1906.
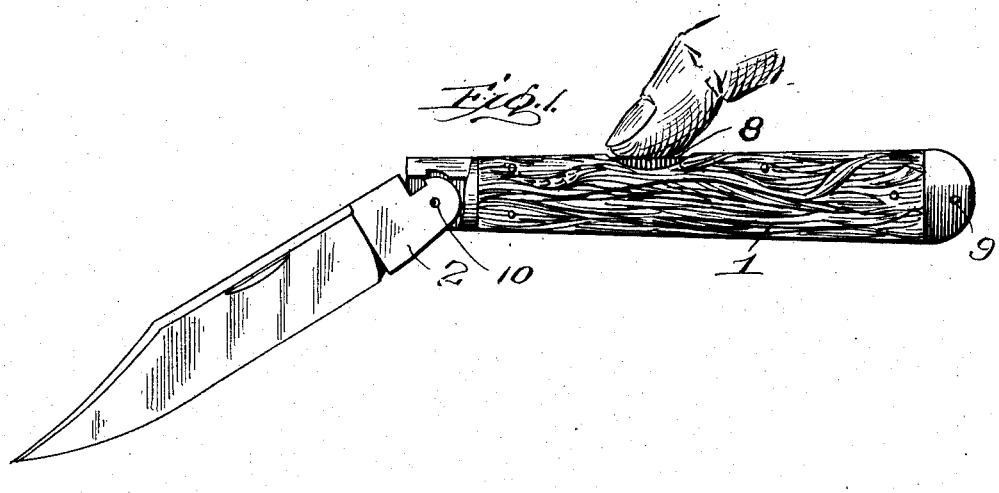
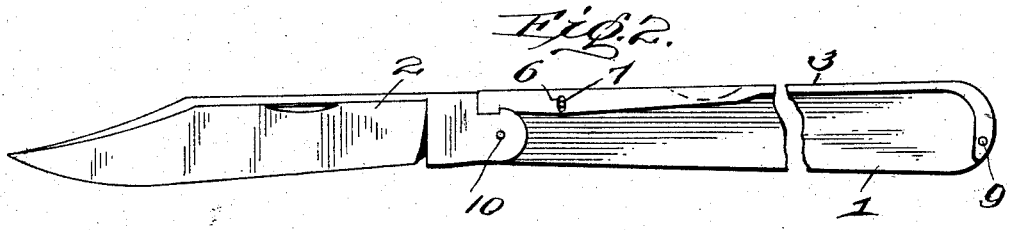
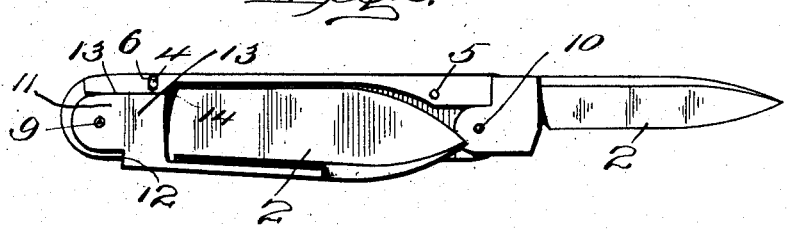
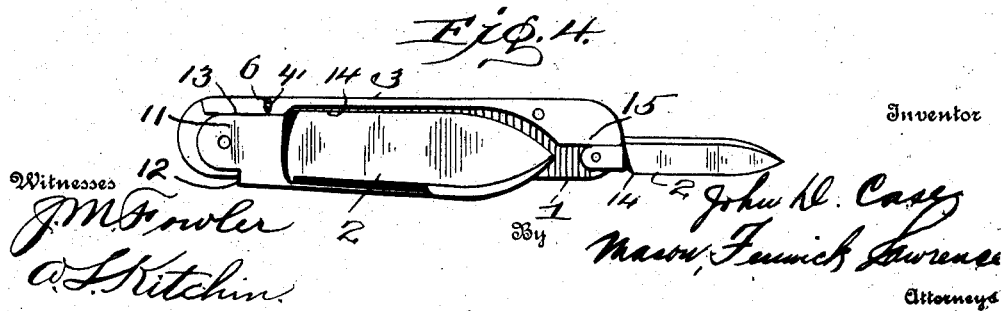
Witnesses
J. M. Fowler
O. L. Kitchin
Inventor
John D. Case
By Mason, Fenwick & Lawrence
Attorneys

UNITED STATES PATENT OFFICE.

JOHN DEBORAH CASE, OF LITTLE VALLEY, NEW YORK.

POCKET-KNIFE.

No. 866,431.

Specification of Letters Patent.

Patented Sept. 17, 1907.

Application filed February 16, 1906. Serial No. 301,565.

*To all whom it may concern:*

Be it known that I, JOHN DEBORAH CASE, a citizen of the United States, residing at Little Valley, in the county of Cattaraugus and State of New York, have invented certain new and useful Improvements in Pocket-Knives; and I do hereby declare the following to be a full, clear, and exact description of the invention, such as will enable others skilled in the art to which it appertains to make and use the same.

This invention relates to improvements in knives and more particularly to knives with folding blades commonly known as "pocket knives."

The invention comprises a knife having a handle, a folding blade pivoted therein and a specially constructed spring for retaining the blade in any of its adjusted positions.

It also consists in a knife having a handle with a plurality of blades pivoted therein and a spring secured near its ends to the handle for holding the blades in their adjusted positions.

The invention further consists in the production of a knife with the rivets for securing the spring therein, so positioned in relation to the pivotal rivets holding the blade in position, as to prevent the jamming or pressing the knife blade against the spring when the said blade is in its folded or closed position.

The object in view is the production of a knife, that by a special construction of spring, may be easily opened and closed but rigidly held in position, in either its open or closed position.

Another object in view is the production of a knife having a spring secured to the handle near the ends thereof, so as to permit the use of a wide blade and thus overcome the objections of a central rivet.

A further object in view is the production of a knife and a specially constructed spring therefor and a knife blade adapted to coöperate with the specially constructed spring so as to permit the blade being so formed as not to be necessary to have a chorl made therein.

With these and other objects in view, the invention comprises certain other novel constructions, combinations and arrangements of parts as will be hereinafter fully described and claimed.

In the accompanying drawing,—Figure 1 represents a side elevation of a knife embodying my invention, certain parts being broken away to better disclose certain features of the invention. Fig. 2 is a vertical section of Fig. 1 showing the special construction of spring. Fig. 3 is a side elevation of a knife embodying the preferred construction of my invention, one of the sides being removed to disclose the interior construction and arrangement of parts. Fig. 4 is a side elevation of a knife with one side of the handle being removed and showing a slightly modified form of spring.

In the preferred embodiment of my invention as disclosed in the drawing, 1 indicates any suitable handle and 2, a specially constructed knife blade adapted to be secured in handle 1.

3 indicates my specially constructed spring and may be modified slightly as disclosed in the drawings to accommodate different sized blades. One of the special features of the spring is the way in which the same is secured in position. As will be observed from Fig. 3, it will be seen that the spring is secured in position by rivets 4 and 5 located a short distance from the ends. In one end of the spring is located a slot 6. Slot 6 is preferably positioned crosswise of the spring instead of lengthwise in order to permit the necessary movement of the spring. The spring as will be observed from an examination of the drawings, is made with enlarged portions on each end, but the center is made thin so as to allow a sufficient spring for holding the blades in their several positions. By this construction of spring, the usual form of spring having an enlarged portion in the center is avoided and consequently will give a larger free space for the blades to occupy.

In Fig. 2 is shown a slightly modified form of spring, which is especially adapted for use in a lock knife. This spring is secured near one end rigidly to the handle and at the other end is secured in place by means of a slot 6 and the rivet 7. The blade used in this knife may be of the ordinary style or specially constructed so as to avoid the use of the usual chorl. In this form of lock knife the spring 3 is weakened or made thin at the rear portion, so as to permit more readily the depression of said spring as shown at 8 in Fig. 1.

As will be observed from an inspection of the drawings, the rivets 4 and 5 are positioned a short distance nearer the center of the handle than the rivets 9 and 10. By this construction, when the blade is in its closed position it will not jam or strike the spring.

The blade as disclosed in Fig. 3 is of special construction and particularly adapted to the form of spring disclosed in this application. This blade is formed with the usual shank 11 and offset portion 12, but is made with a comparatively long flat portion as 13 for fitting against the end of the spring 3. The cutting portion of the blade is made considerably wider than the shank and projects as at 14 below the shank. This will permit of the grinding or sharpening of the blade without forming in the blade the usual chorl. In this way the blade is strengthened where in ordinary blades it is weakened by the insertion of the chorl. The special construction of the spring 3 which has enlarged ends and a small center portion permits of the use of the specially constructed blade. If it is desired, one end of the spring 3 may be considerably enlarged as at 15 in order to accommodate a small blade, the other end being of a convenient size to accommodate the usual sized blade.

One of the important features of this invention is the particular form of spring. This spring is made with a long, thin, central portion, so as to give an easy flexible spring but one that is sufficiently strong to accomplish the purposes for which it is used. A knife constructed with this form of spring will be easily opened and closed but when in either position will be securely held in such position. This is especially true of a lock knife as disclosed in Figs. 1 and 2, where the notched and hooked portions are easily disengaged by a slight pressure on the spring.

An important feature of this invention is the position of the rivets 4 and 5 and 9 and 10. As will be observed from an inspection of the drawing, rivets 4 and 5 which hold the spring in place are positioned nearer the center of the handle than rivets 9 and 10, which act as pivots for the knife blade. By this arrangement of rivets, the blade is easily opened, but when closed, cannot be forced down upon the spring because the rivets 9 and 10 will act as stops as well as the spring. In order to force the knife blade down upon the spring, it would be necessary to either break the rivets 4 and 5, or rivets 9 and 10. This construction prevents any of the blades coming in contact with the spring and thus insures the safe protection of the cutting edge.

Having now described my invention, what I claim as new and desire to secure by Letters Patent is:—

1. A knife comprising a handle, a blade pivoted therein, a spring pivoted at one end for retaining the knife in position and being designed to bow centrally during the opening and closing of the blade, said spring being formed with an elongated aperture near the end opposite said pivot, and means secured to said handle and passing through the aperture in said spring for operating in said slot for permitting the spring to hold the blade in position and yet permit the spring to bow centrally during the operation of the blade.

2. A knife, comprising a handle, blades pivotally secured therein, formed with shanks having comparatively long portions, and a spring for retaining said blades in position formed with a comparatively long, thin central portion, and having enlarged portions upon each end thereof, the enlarged portions having comparatively long flat sides for contacting flatwise with the flat portion of the shank for firmly holding said blades in their inner or outer position, said spring being formed with apertures near each end thereof for accommodating rivets for retaining said spring in position, one of said apertures being larger than the rivet passing therethrough for permitting free movement of the spring.

3. A knife, comprising a handle, a blade secured therein, a spring for retaining said blade in position formed with a comparatively long central portion, enlarged end portions and an elongated aperture in one of the end portions for permitting the operation of the spring, and means engaging said apertures for holding said spring in operative position.

4. A knife, comprising a handle, a spring back secured therein by rivets secured a short distance from the ends thereof, said spring being formed with an elongated aperture near one end for permitting free movement of said spring, and a blade pivotally secured in said handle, the pivots of said blade being positioned further from the center of said spring than the rivets securing the spring back in place, said elongated apertures permitting sufficient movement of said spring for operating said blades.

5. A knife comprising a handle, a blade pivotally secured to said handle, a long, thin, flat spring back pivotally secured to said handle at one end and having an elongated aperture for accommodating securing means at the opposite end, said spring being adapted to hold said blade positively in its various positions, and means passing through said apertures for holding said spring in position, said elongated aperture permitting said spring to bow during the movement of the blade.

In testimony whereof I affix my signature in presence of two witnesses.

JOHN DEBORAH CASE.

Witnesses:
 MARION J. RICH,
 MARGARET L. CASE.